United States Patent
Dunchock

(10) Patent No.: US 6,497,394 B1
(45) Date of Patent: Dec. 24, 2002

(54) CUP ANCHOR

(76) Inventor: Richard Stephen Dunchock, 254 Driftwood Rd., Corona Del Mar, CA (US) 92625

(*) Notice: Subject to any disclaimer, the term of this patent is extended or adjusted under 35 U.S.C. 154(b) by 0 days.

(21) Appl. No.: 09/342,251

(22) Filed: Jun. 29, 1999

(30) Foreign Application Priority Data

Apr. 14, 1999 (TW) ................................. 88205706 U

(51) Int. Cl.⁷ .............................................. F16B 47/00
(52) U.S. Cl. ............................... 248/205.8; 248/206.2; 248/362; 248/363
(58) Field of Search .......................... 298/311.2, 205.8, 298/206.2, 346.01, 346.11, 346.5, 310; D7/619; 248/205.5, 205.6, 205.8, 206.2, 362, 363

(56) References Cited

U.S. PATENT DOCUMENTS

| | | | | | |
|---|---|---|---|---|---|
| D164,572 S | * | 9/1951 | Happe | ........................... | D7/619 |
| 4,756,497 A | * | 7/1988 | Lan | ........................... | 248/205.8 |
| 4,759,525 A | * | 7/1988 | Cross et al. | ............. | 248/206.2 |
| 5,014,956 A | * | 5/1991 | Kayali | ...................... | 248/311.2 |
| 5,180,132 A | * | 1/1993 | Pearson et al. | ........... | 248/205.5 |
| D351,970 S | * | 11/1994 | Barrio | ........................... | D7/619 |
| 5,516,019 A | * | 5/1996 | Moon | ....................... | 248/205.8 |
| 5,961,086 A | * | 10/1999 | Moore et al. | ............. | 248/311.2 |
| 5,970,860 A | * | 10/1999 | Yip | ............................ | 248/205.8 |
| D416,764 S | * | 11/1999 | Gagne | .......................... | D7/619 |
| 5,996,950 A | * | 12/1999 | Richter | ..................... | 248/205.8 |
| 6,045,111 A | * | 4/2000 | Hsieh | ....................... | 248/205.8 |
| 6,047,938 A | * | 4/2000 | Mitchell | ................. | 248/346.11 |

* cited by examiner

Primary Examiner—Leslie A. Braun
Assistant Examiner—Tan Le
(74) Attorney, Agent, or Firm—Jacobson Holman PLLC

(57) ABSTRACT

A cup anchor that is especially designed to offer a material or material base's underside a shallow indentation. On the anchor or base stand plate of the shallow indention's region are nuts or screw holes. Once the screws enter the washers or raised ring, an anchor is secured to the material or the material base's underside. In this way, the material may be secured in place upon a table or desk and won't shake when bumped or fall over when knocked.

3 Claims, 6 Drawing Sheets

CUP ANCHOR

BACKGROUND OF THE INVENTION (a) Field of the Invention

This invention's principal objective is to offer a convenient product to secure items (eg. beverage stand, penholder, ashtray etc.). By securing their placement on a flat table or desk, should the items be bumped, they won't shake or fall over.

(b) Description of the Prior Art

Conventional practices of placing a teacup or other beverage container in beverage stands (as shown in FIG. 1) only allows for an anchor to be fastened perpendicularly or stuck on a perpendicular wall in a car or indoors. There's never been any allowance made to fasten an anchor to a table surface or a desk surface for practical use. When the said beverage stand 1 is placed directly upon the surface of the said table or desk, and when the said beverage stand 1 is slightly bumped, the entire structure of the said beverage stand 1, as well as the teacup or beverage container placed within, will shake causing some of the beverage to splash upon the said table or desk surface. Should the bump be of great force, the whole structure of the said beverage stand 1, as well as the teacup or beverage container, will tumble causing the beverage to spill upon the table or desk surface. Of greater consequence is, if the beverage spills upon table or desk's articles or documents and files, stains to these articles will occur which are difficult to clean up. In view of these problems, the inventor meticulously performed studies and tests to create this invention, the Cup Anchor.

Figure 1:
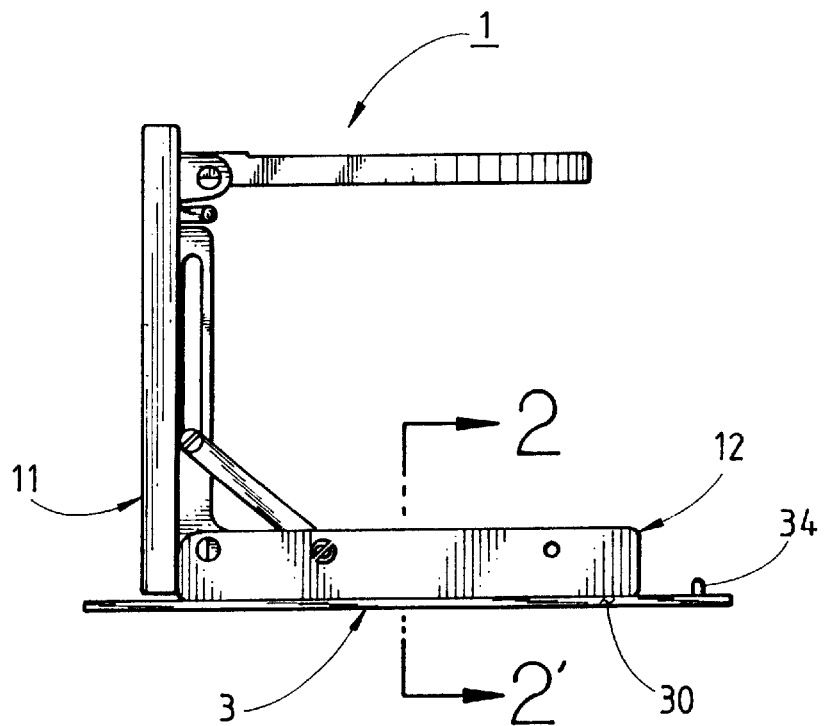
FIG. 1 is a left profile diagram of the installed invention when the upper frame is used as a beverage stand.

The numbers in the drawings indicate:
1—Beverage stand
2—Penholder
3, 3'—Anchor
4, 4'—Gasket
4a—Washer
4'a—Flat spacer
5—Screw
5'—Screw head
11—Set plate
12—Base
20—Penholder body
21—Shallow indentation
22—Base plate
23—Nut
30, 30'—Anchor plate
31—Raised platform
32—Trough
33, 33'—Hole
34—Protrusion
35—Indentation
40—Gasket body
41—Raised ring
42, 42'—Hole
43—Extra strength lip
51—Shaft
120—Base stand plate
121—Shallow indentation
122—Nut

DESCRIPTION OF THE PREFERRED EMBODIMENT

Figure 2:
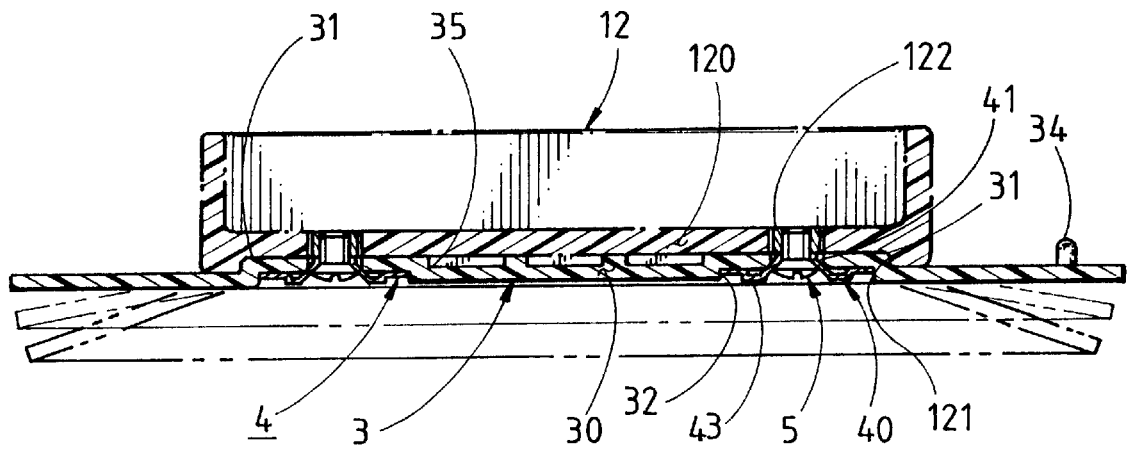
FIG. 2 is a vertical cross-sectional drawing of FIG. 1's 2~2' line positioning.

Please refer to FIG. 1 and FIG. 2 for the practical use of the assembled invention's beverage stand 1. The principal component of the beverage stand 1's base 12 is that it's equipped with a shallow indentation 121. Within the said indentation is base stand plate 120, which has the nuts 122 fastened or the screw holes drilled (omitted from the drawings.) Once the screws 5 are all inserted in the gasket 4, they are screwed in, fastening the anchor 3 of the said beverage stand 1 to an exterior material, which acts as the base.

Figure 3:
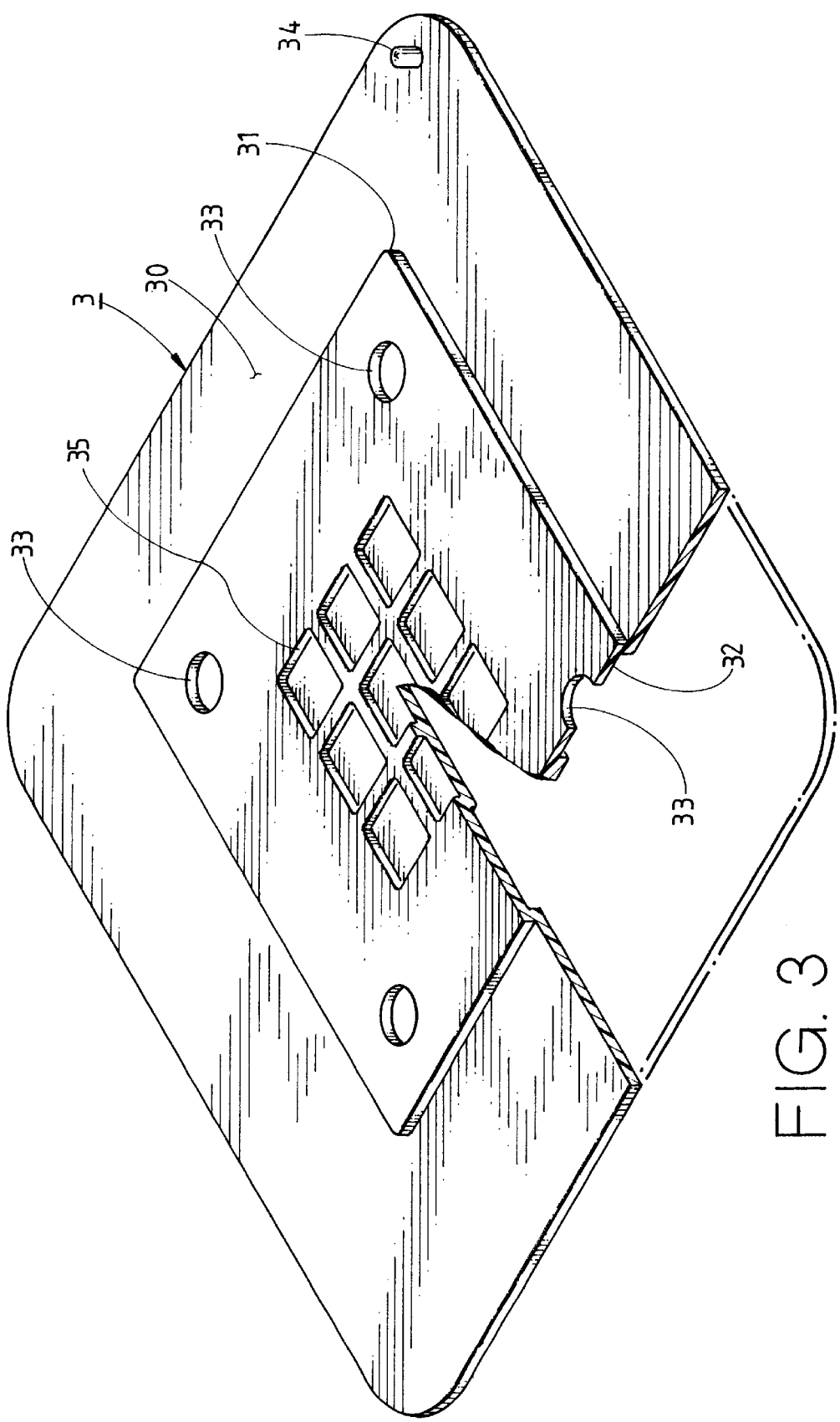
FIG. 3 is a perspective drawing of the invention's anchoring plate.

The said anchor 3, as shown in FIG. 3, is produced from a partially soft (a suitable degree of soft and hard) plastic or rubber and can be manufactured as a square, rectangle, circle, oval or other suitable shapes. Merely install the base plate 30 on the underside of the base 12's shallow indentation 121, whose shape, size and depth function in conjunction with raised platform 31. In addition, the backside, circling around the rim of the said raised platform 31 is the trough 32; upon the raised platform 31 are the holes 33, and are homologous with the said base plate's nuts 122 or the screw holes. Next, the entire raised platform 31 is inserted into the shallow indentation 121 at the bottom of the said base 12.

Figure 4:
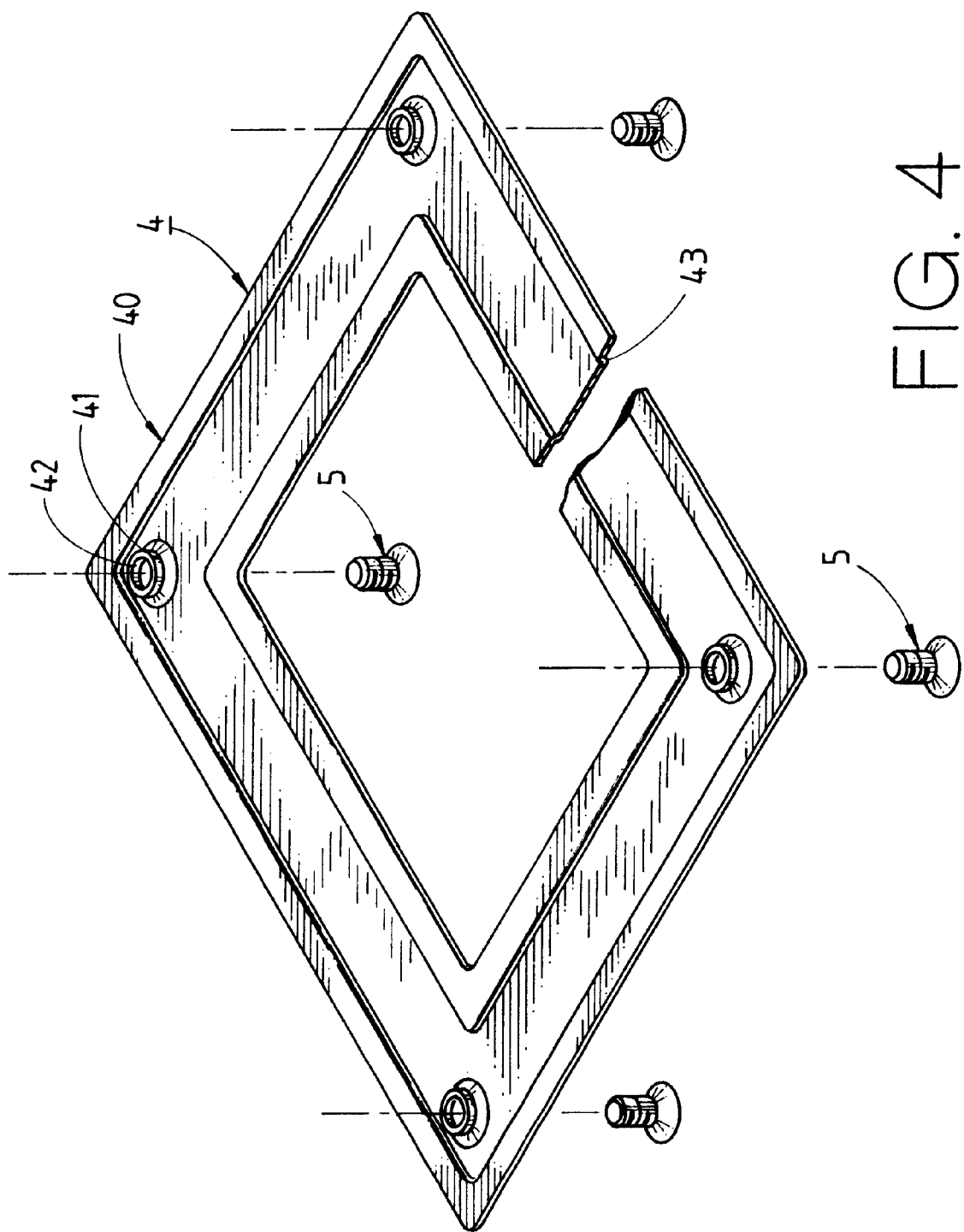
FIG. 4 is a perspective drawing of the invention's gasket.

Please refer to FIG. 4 to examine the gasket 4. This metal plate is pierced during manufacturing to form the gasket body 40. Upon the gasket body 40 are the raise rings 41, and are homologous with the aforementioned nuts 122 or the screw holes. The raised rings' thickness must not be thicker than the anchor plate 30. Thus, each raised ring 41 is pierced with a hole 42 and then lay the gasket 4 on the underside of the said anchor plate 30's trough 32. Next, one screw 5 is inserted into each of the said holes 42. When the said anchor 3 is assembled securely upon the base stand plate 120, the said raised ring 41 may butt against the said base stand plate 120's nut 122 or directly butt against the said base stand plate 120. In this way the gasket body 40 is pressed tightly against the said anchor plate 30 and secured in the shallow indentation 121 at the bottom of base 12. Align the holes 33 on the said anchor plate, with the raised ring 41 on the gasket body 40, thereby allowing the threads of the screws 5 to pass through without touching. When the beverage stand 1 is pulled, it prevents each hole 33 from becoming damaging.

Once the bottom side of the beverage stand 1 or similar product's base 12 is assembled to the partially soft anchor 3, as mentioned above (as shown in FIG. 1,) and since the anchor is made from a partially soft gluing material, by merely lifting the beverage stand by its set plate 11, the edges of the said anchor plate 30 will bow as FIG. 2's light lines illustrate. This will produce a natural convex, altering the original flat shape of the anchor plate, into the shape of a suction cup. By placing the beverage stand 1 on a flat table or desk, the so-called suction cup's anchor 3 becomes affixed upon the said table or desk. Lifting the beverage stand 1 will prove futile so that there's no possibility to move its position or pull it down. In addition, since it's secure, should the said beverage stand 1 be bumped or shaken, it will not fall over.

When the invention's beverage stand 1 or similar type material is fastened upon a flat table or desk, as stated previously, the anchor 3 is able to snuggly secure itself by suction, upon the said table or desk surface, making the slightest movement as well as tipping over, quite difficult. However, should one need to remove the beverage stand 1 or change its positioning, one merely lifts up the corner of the anchor plate 30 and the beverage stand 1 easily lifts up off the surface. This speed and convenience is not in the least difficult. In order to make the aforementioned removal of the anchor 3 more convenient, when the anchor 3 is molded, a small protrusion 34 is added to one of the corners of anchor plate 30. This allows the fingers to pinch the said protrusion 34 and lift up anchor 3, making it fast and easy.

At the center of the anchor plate 30, of this invention's anchor 3, is the molded raised plateform 31, inserted into the shallow indentation 121 at the bottom of the beverage stand 1's base 12. Its slight thickness is adequate in preventing deforming. As is depicted in FIGS. 2 and 3, the indentations 35 are situated upon the said raised platform 31 and prevent deforming during manufacturing. In addition, the height of the said raised ridge 31, in principle, will not exceed the depth of the shallow indentation 121. When the design is such that the raised ridge 31 is shallower than the said shallow indentation 121, then once the assembly is secured upon the said 121 shallow indentation, it will naturally take a convex shape as depicted by the fine line drawing in FIG. 2. Besides, when the said beverage stand 1's set plate 11 is lifted up, the edges of the said anchor plate 30 will flex concavely as FIG. 2's thick lines illustrate, creating a larger suction cup and giving greater force.

Since this invention's anchor 3 is designed to use suction upon a table or desk, the said anchor 3 needs to be fastened firmly on the beverage stand 1. Therefore, as shown in FIGS. 2 and 4, this gasket body must be molded with one circle of extra strength lip 43 or more upon it so as to be inserted securely into the anchor plate 30's trough 32. By adding strength and durability to the gasket 4's gasket body 40, deforming of its flatness will be prevented.

Figure 5:
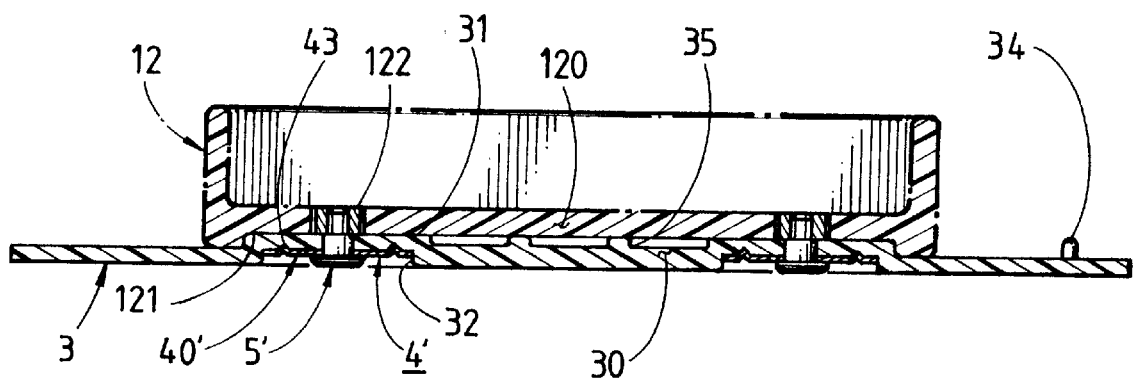
FIG. 5 is a cross-sectional drawing of another practical use for FIG. 1's 2~2' line position.
Figure 6:
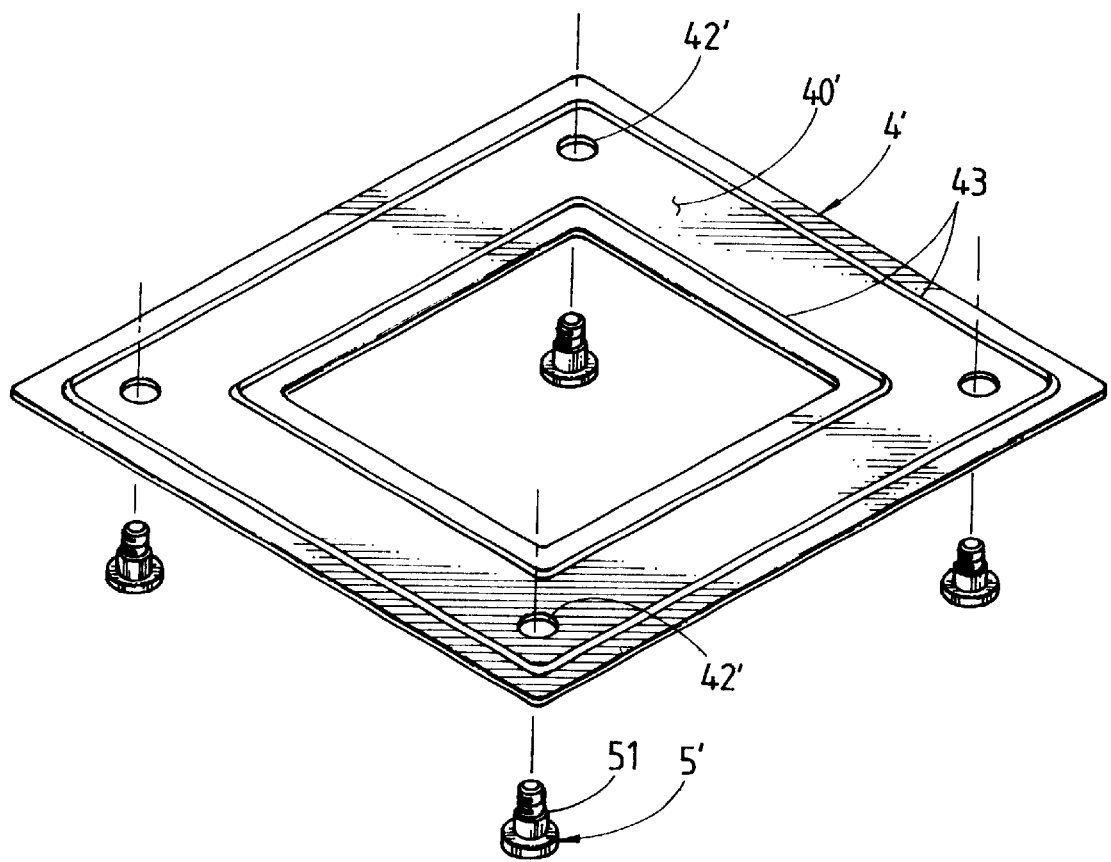
FIG. 6 is a perspective drawing of the gasket for the invention's other practical use as illustrated in FIG. 5.

Please refer to FIGS. 5 and 6 to see another practical aspect of this invention. The practical differences are in the structural modifications of the gasket 4' and screws 5'. The gasket body 40' is pierced with holes 42' for screws 5' and there are no raised rings 41 (as shown in FIG. 4.) The rest of the structure is identical to the original structure. The stem of the said screws 5' have a larger diameter shaft 51, and each said screw 5' is inserted into each hole 42' of the gasket body 40'. When the anchor 3 is assembled into the shallow indentation 121 of the beverage stand 1's base 12, the said anchor plate 30's individual holes 33 (as shown in FIG. 3) will be pierced by the said screw 5's shaft 51. However the threads of screws 5' will not make any contact with the holes 33. As the beverage stand 1 is pulled, each hole 33 of the said anchor plate 30 will not be damaged.

Figure 7:
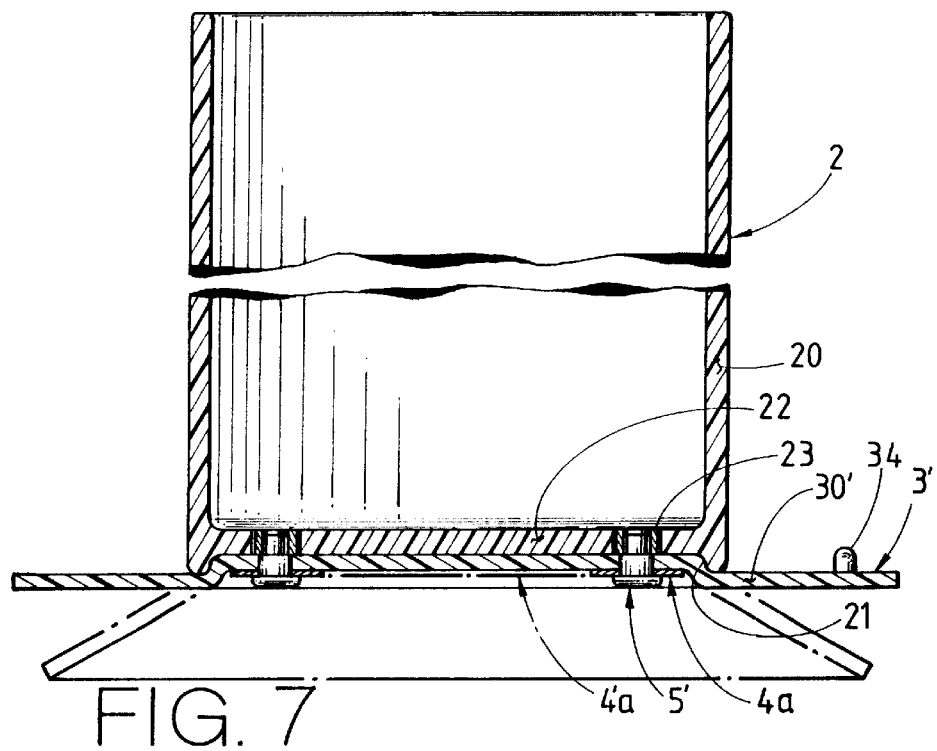
FIG. 7 is a vertical cross-sectional drawing of the invention with the penholder installed.
Figure 8:
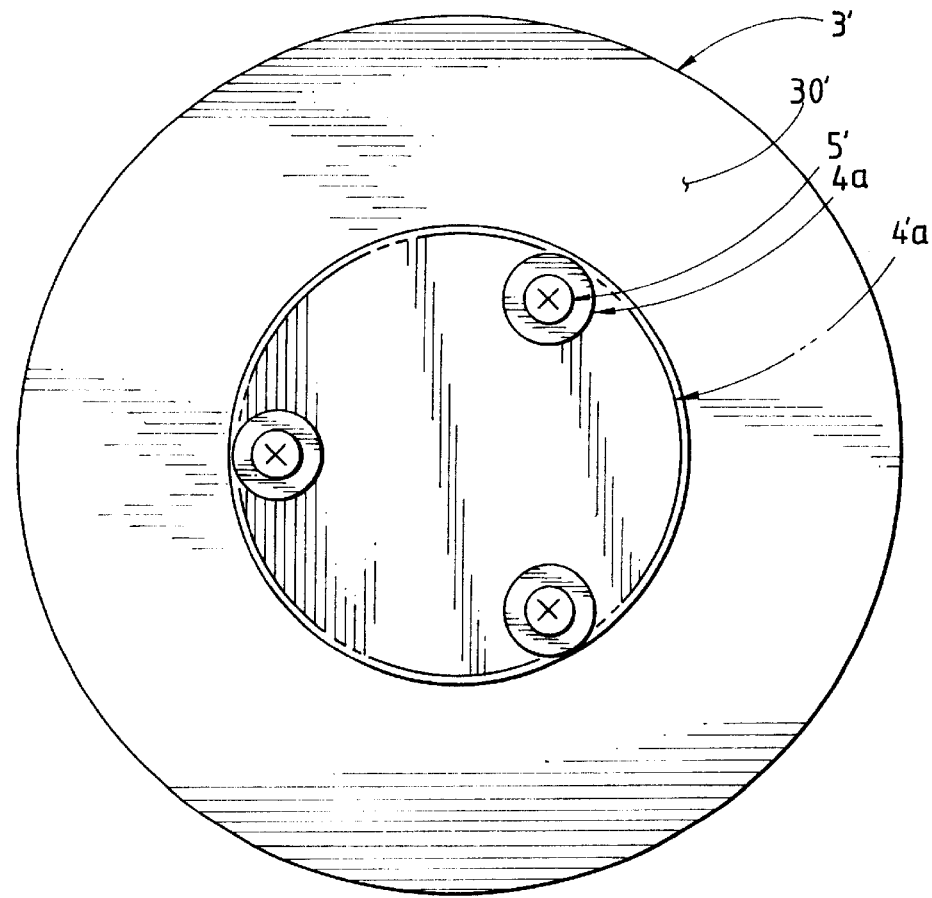
FIG. 8 is an upward view of FIG. 7's practical penholder.
Figure 9:
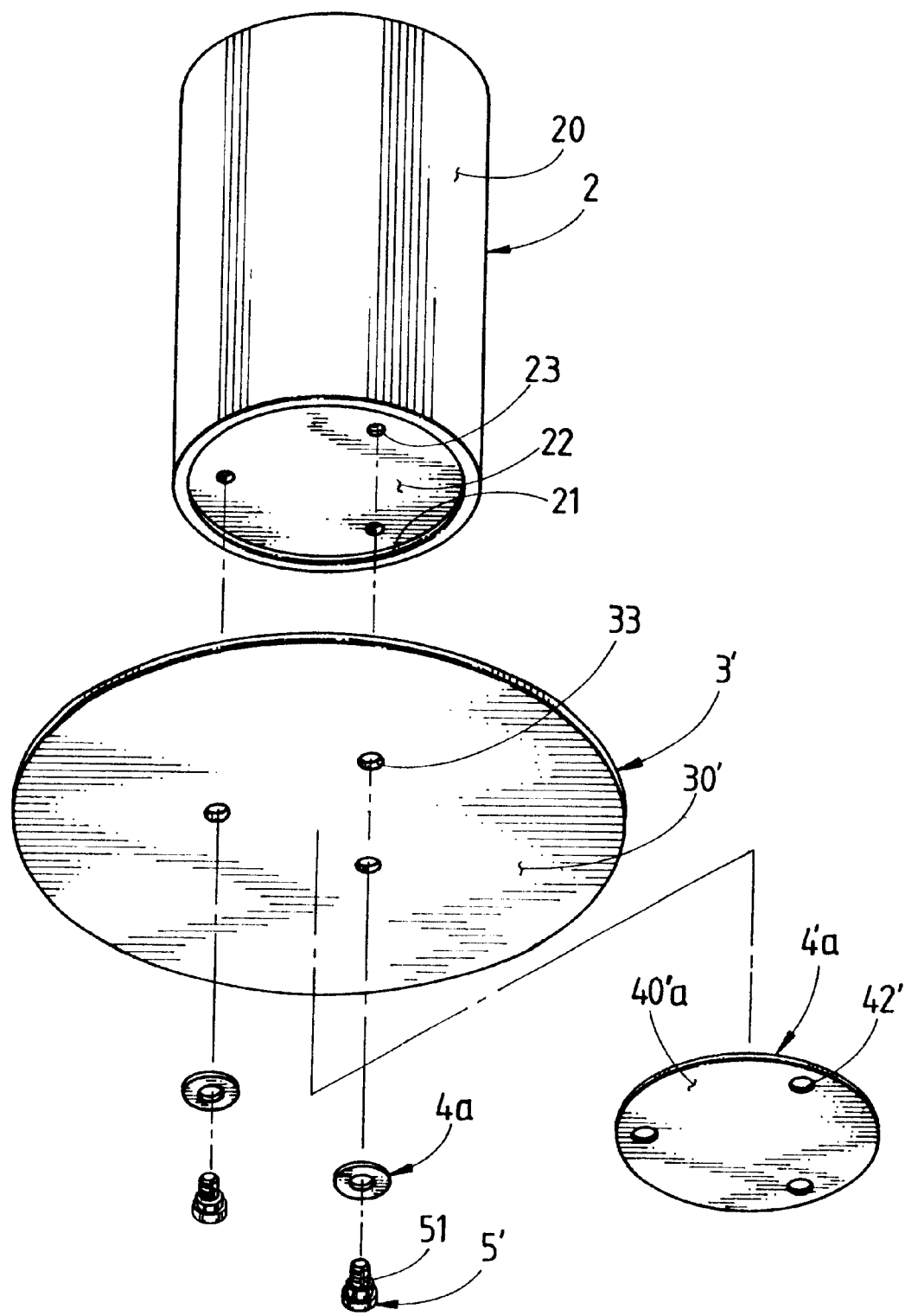
FIG. 9 is a perspective segmented drawing of the penholder's practical use in FIG. 7.

Please refer to FIGS. 7, 8 and 9 for an even more practical look at this invention. This is a direct attachment of a penholder, ashtray or other similar object's underside, and is merely fastened from the holes 33' on the anchor plate 30'. In addition, there are no raised rings on the partially soft rubber anchor 3'. A shallow indentation 21 is formed into the base of the penholder body 20 of the said penholder 2. Upon the base plate 22, within the said indentation, are nuts 23 or screw holes drilled. After each shaft 51 of the screw 5' is passed directly through the washer 4*a,* assemble the anchor 3' upon the shallow indentation 21's base of penholder 2 or other similar products. Or the shafts 51, of screws 5', have passed through the flat spacer 4'*a* and then through the holes 42' of the body 40'*a*, and then assemble the anchor 3' to the shallow indentation 21's base of penholder 2. In the same way, affixing the anchor 3' may complete the penholder 2 or other similar material's base. In this way, the said material may be placed and secured in a position upon a flat table or desk, and it won't shake when bumped or fall over when it's been knocked.

The penholder 2 or similar material's base is secured in a practical manner to the anchor 3' (as shown in FIG. 7.) The said penholder 2's base plate underside is designed with an appropriate shallow indentation 21. When washer 4*a* or flat spacer 4'*a* is assembled and when the partially soft rubber anchor 3' is in the said shallow indentation 21, the edges of the said anchor plate 30' will form a natural convex shape, like the light lines of FIG. 7. This will cause the said anchor plate 30' to form into a suction cup. Therefore, when needing to place the penholder material on the table or desk, the said so-called suction of the anchor 3' is secured upon these surfaces with suction. Lifting or even sliding the said penholder body 20 becomes impossible. Lifting from any point at the edge of the said anchor plate 30', one must use a finger to lift, or by using one's fingers to pinch the protrusion 34 of the anchor plate 30' and lifting up. In this way, one is able to remove or slide the set.

What is claimed is:

1. A cup anchor comprising:

a base having a shallow indention and within said shallow indentation is at least one hole;

an anchor made of a partially soft rubber, said anchor including a raised platform whose shape, size and depth match the shallow indentation and a ringed trough formed in a backside of the anchor, opposite to said raised platform and having at least one hole in said ringed trough whose positioning and quantity are aligned with the at least one hole of said base, the backside of the anchor being flat in a position of rest;

a gasket including a body having one or more raised lips and having at least one hole aligned with the at least one hole of said anchor and said at least one hole of said base;

and at least one screw positioned in said at least one hole of said gasket, said at least one hole of said anchor and said at least one hole of said base with a head of said at least one screw being recessed from a plane formed by the backside of said anchor so that when the cup anchor is lifted, said anchor moves from a flat form in the position of rest to a convex shape to form a suction cup and to firmly secure the cup anchor upon a flat table or desk.

2. The cup anchor in accordance with claim 1, further comprising at least one washer or a flat spacer aligned with the at least one screw so that once each screw is pushed through its respective washer and the anchor is affixed to the underside of the base within the shallow indentation, the cup anchor may be secured upon the flat table or desk.

3. The cup anchor in accordance with claim 1, further comprising a protrusion of said anchor which can be grasped by the fingers and lifted to release the anchor and whose external shape includes one of a square, a rectangle, a circle, and an oval shape.

* * * * *